United States Patent
Kowalczyk et al.

(10) Patent No.: US 11,762,707 B2
(45) Date of Patent: Sep. 19, 2023

(54) SERVICE LOAD INDEPENDENT RESOURCE USAGE DETECTION AND SCALING FOR CONTAINER-BASED SYSTEM

(71) Applicant: International Business Machines Corporation, Armonk, NY (US)

(72) Inventors: Szymon Kowalczyk, Cracow (PL); Piotr P. Godowski, Cracow (PL); Michal Paluch, Cracow (PL); Tomasz Hanusiak, Cracow (PL); Andrzej Pietrzak, Podleze (PL)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 17/217,183

(22) Filed: Mar. 30, 2021

(65) Prior Publication Data

US 2022/0318058 A1    Oct. 6, 2022

(51) Int. Cl.
*G06F 9/50* (2006.01)
*G06F 9/345* (2018.01)
*G06F 9/355* (2018.01)

(52) U.S. Cl.
CPC ............. *G06F 9/505* (2013.01); *G06F 9/345* (2013.01); *G06F 9/3555* (2013.01); *G06F 9/5072* (2013.01)

(58) Field of Classification Search
None
See application file for complete search history.

(56) References Cited

U.S. PATENT DOCUMENTS

| | | | |
|---|---|---|---|
| 10,346,216 B1 | 7/2019 | Yang et al. | |
| 2016/0378517 A1* | 12/2016 | Zellermayer | G06F 9/4555 718/1 |
| 2019/0042321 A1* | 2/2019 | Venkatesh | G06F 9/45558 |

OTHER PUBLICATIONS

Takahashi, K. et al., A Portable Load Balancer for Kubernetes Cluster, HPC Asia 2018, Jan. 28-31, 2018, 10 pages, Chiyoda, Tokyo, Japan.
Automatically scaling pods, 16 pages, Aug. 21, 2020, found at: https://docs.openshift.com/aro/4/nodes/pods/nodes-pods-autoscaling.html.
Kubernetes Automatic Scaling, Published Date: Dec. 12, 2019, 9 pages, found at: https://www.magalix.com/blog/kubernetes-automatic-scaling.
Authors et. al.: Disclosed Anonymously, a Method for Bi-directional Scaling within a Cloud Environment, Published Date: Jan. 16, 2020, IP.com No. IPCOM000261018D, 4 pages.

(Continued)

*Primary Examiner* — Sisley N Kim
(74) *Attorney, Agent, or Firm* — Mark Bergner

(57) ABSTRACT

A computer implemented method and related system determine a current load result of a software container executing on a compute node in a container system. In response to determining that the current load result exceeds a predetermined scale-up threshold for the software container, the method adds a first plurality of replicas of the software container to the compute node, where a quantity of the first plurality of replicas is related to the current load result. In response to determining that the current load result is less than a predetermined scale-down threshold for the software container, the method deletes a second plurality of replicas of the software container from the compute node, where a quantity of the second plurality of replicas is related to the current load result.

16 Claims, 5 Drawing Sheets

(56) References Cited

OTHER PUBLICATIONS

Authors et. al.: Disclosed Anonymously, Mechanisms for Hybrid Scaling of Containerized Virtual Machines and Resources, Published Date: Dec. 19, 2019, 5 pages, IP.com No. IPCOM000260771D.
Mell, P. et al., "The NIST Definition of Cloud Computing", Recommendations of the National Institute of Standards and Technology, NIST Special Publication 800-145, 7 pages, Sep. 2011.

* cited by examiner

SERVICE LOAD INDEPENDENT RESOURCE USAGE DETECTION AND SCALING FOR CONTAINER-BASED SYSTEM

BACKGROUND

Disclosed herein is a system and related method for service load independent usage detection and scaling for a container-based system. Container systems may make use of load balancing and special systems to detect an overload condition and to scale up when needed. Such system currently are based on monitoring traditional resources, such as CPU and RAM resources.

SUMMARY

According to various embodiments disclosed herein, a computer implemented method is provided comprising determining a current load result of a software container executing on a computer node in a container system. In response to determining that the current load result exceeds a predetermined scale-up threshold for the software container, the method disclosed herein includes adding a first plurality of replicas of the software container to the compute node, where a quantity of the first plurality of replicas is related to the current load result. In response to determining that the current load result is less than a predetermined scale-down threshold for the software container, the method disclosed herein also includes deleting a second plurality of replicas of the software container from the compute node, where a quantity of the second plurality of replicas is related to the current load result.

According to various embodiments disclosed herein, a container-based system is provided comprising a memory, and a processor. The processor is configured to determine a current load result of a software container executing on a compute node in a container system. In response to the determination that the current load result exceeds a predetermined scale-up threshold for the software container, the processor is configured to add a first plurality of replicas of the software container to the compute node, where a quantity of the first plurality of replicas is related to the current load result. In response to the determination that the current load result is less than a predetermined scale-down threshold for the software container, the processor is configured to delete a second plurality of replicas of the software container from the compute node, where a quantity of the second plurality of replicas is related to the current load result.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1A:
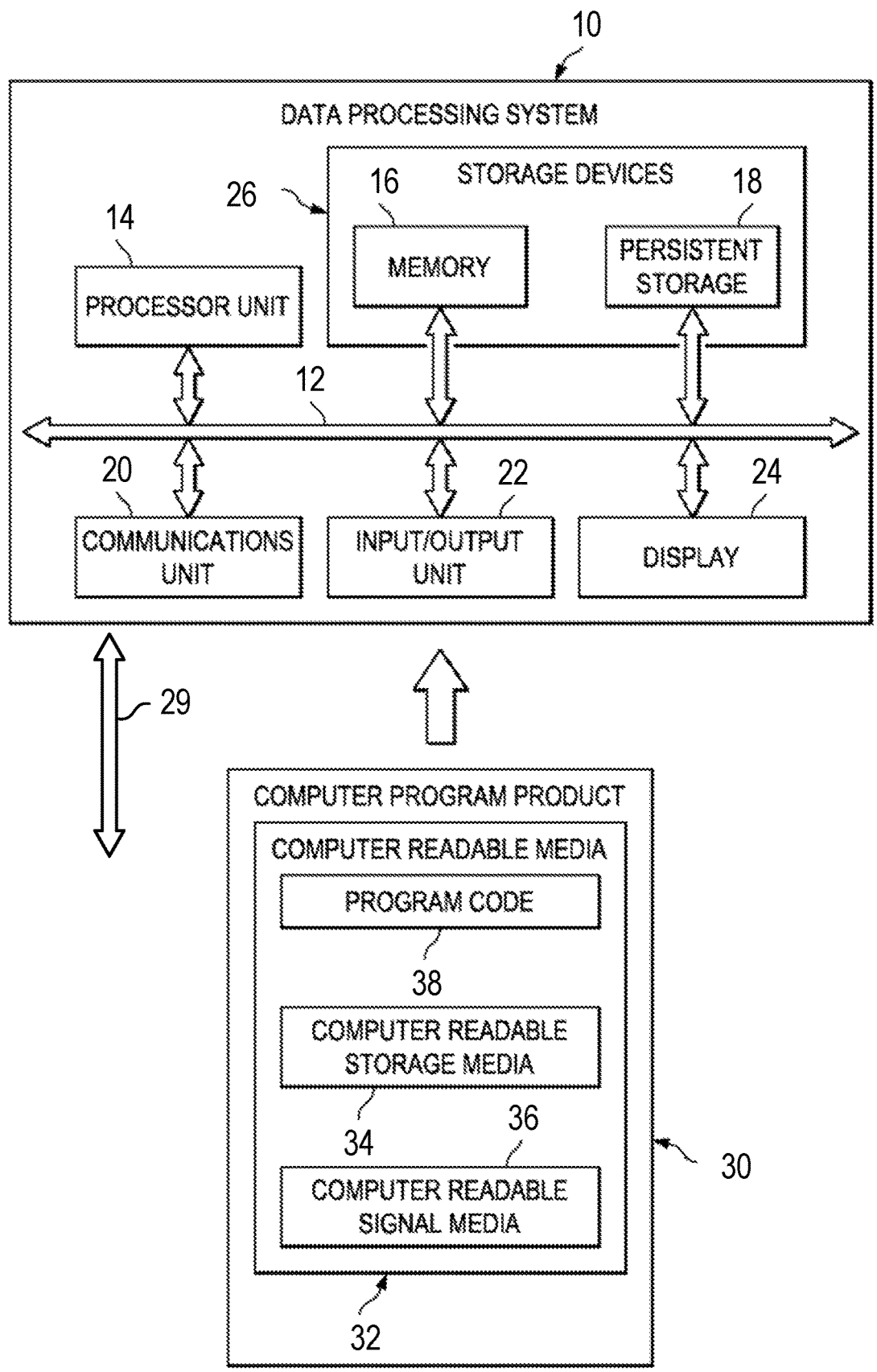
FIG. 1A is a block diagram of a data processing system (DPS) according to one or more embodiments disclosed herein.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network Data Processing System in General FIG. 1A is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
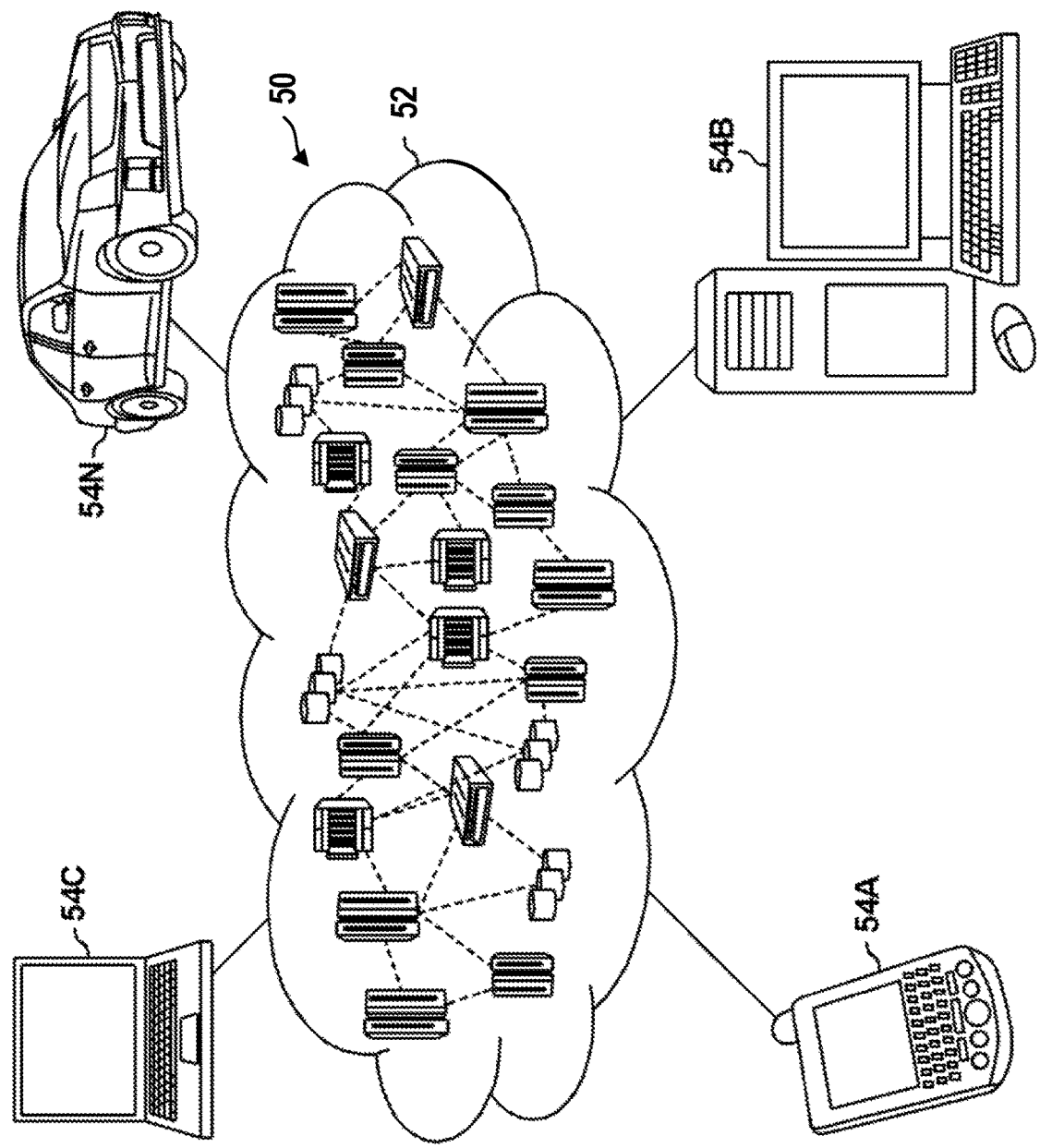
FIG. 1B is a pictorial diagram that depicts a cloud computing environment according to an embodiment disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 1B are intended to be illustrative only and that computing nodes 50 and cloud computing environment 52 can communicate with any type of computerized device over any type of network and/or network addressable connection (e.g., using a web browser).

Figure 1C:
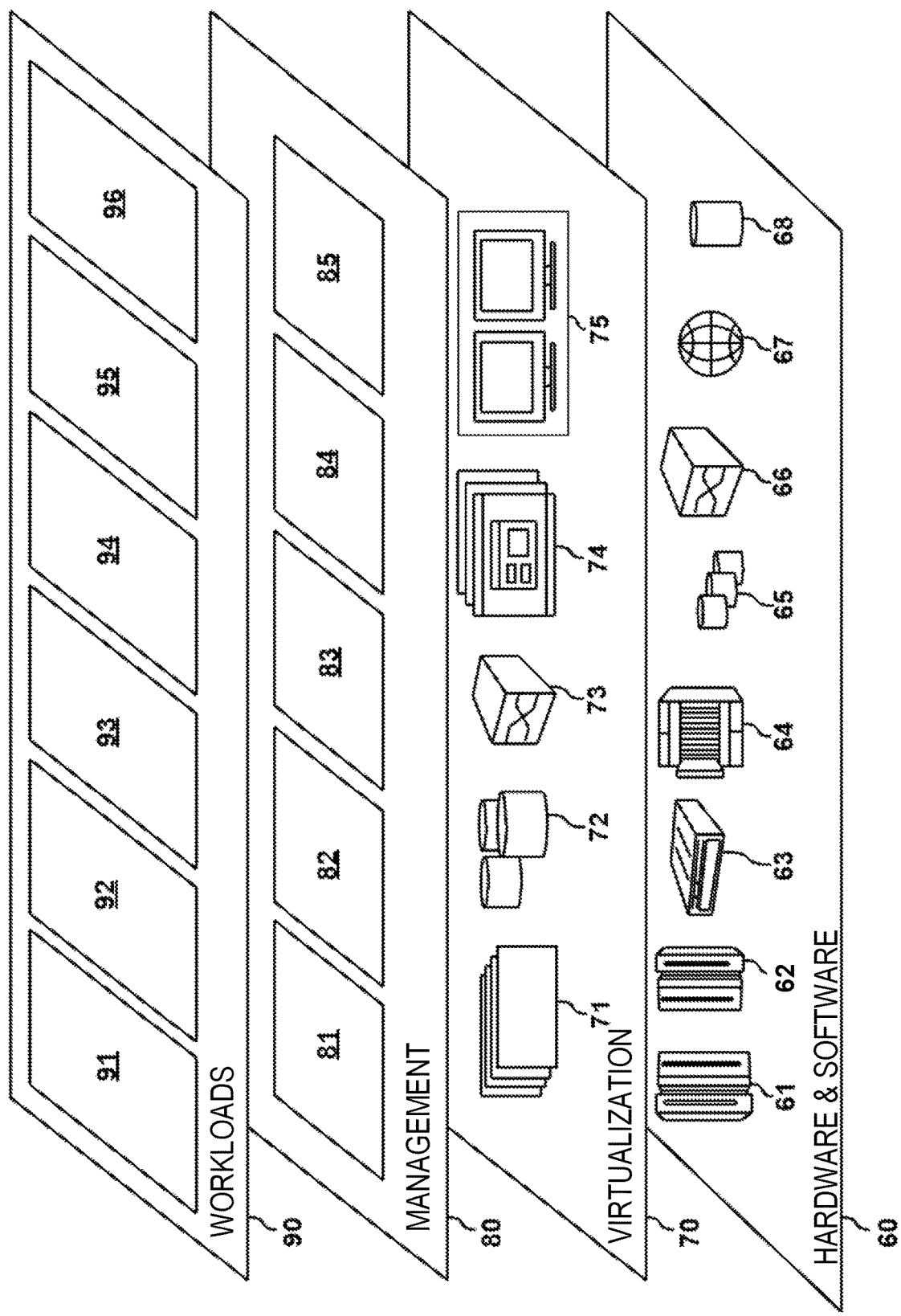
FIG. 1C is a pictorial diagram that depicts abstraction model layers according to an embodiment disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application processing elements 96.

Any of the nodes 50 in the computing environment 52 as well as the computing devices 54A-N may be a DPS 10.

Computer Readable Media

The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Service Load Independent Resource Usage Detection and Scaling for Container-Based System At present, container systems use load balancing and special systems to detect and scale up in situations where there is more demand than usual, based on CPU and RAM monitoring in containers. However, this not suitable for all situations. There are some services and systems where a high load cannot be detected simply by monitoring a system's CPU and RAM resource load.

Most transactional systems are highly dependent on external API calls, and one such API call related to performance detection is a liveness probe. The liveness probe determines the responsiveness of a container. If the liveness probe detects a certain situation, such as a deadlock, it may decide to terminate the container and then restart it. In some instances, however, rapidly developed and not fully tested software may have some bottlenecks that are hard to trace and debug in which the container is locked, even though the resources are stable. In this instance, a liveness probe may not work properly.

Described herein is a system and method that gives the creator of the systems a way to programmatically describe monitoring and alerting where one container cannot efficiently process more requests or additional work. This approach may be used to scale systems up and down to process incoming requests. Using this solution, deployed systems will be more resilient to high fluctuation of usage and incoming traffic—furthermore, for low usage, this solution will save resources for other tasks. For each triggered action (scaled up/down), the alerting system may be triggered for investigation and debugging possibilities.

Figures 2A, 2B:
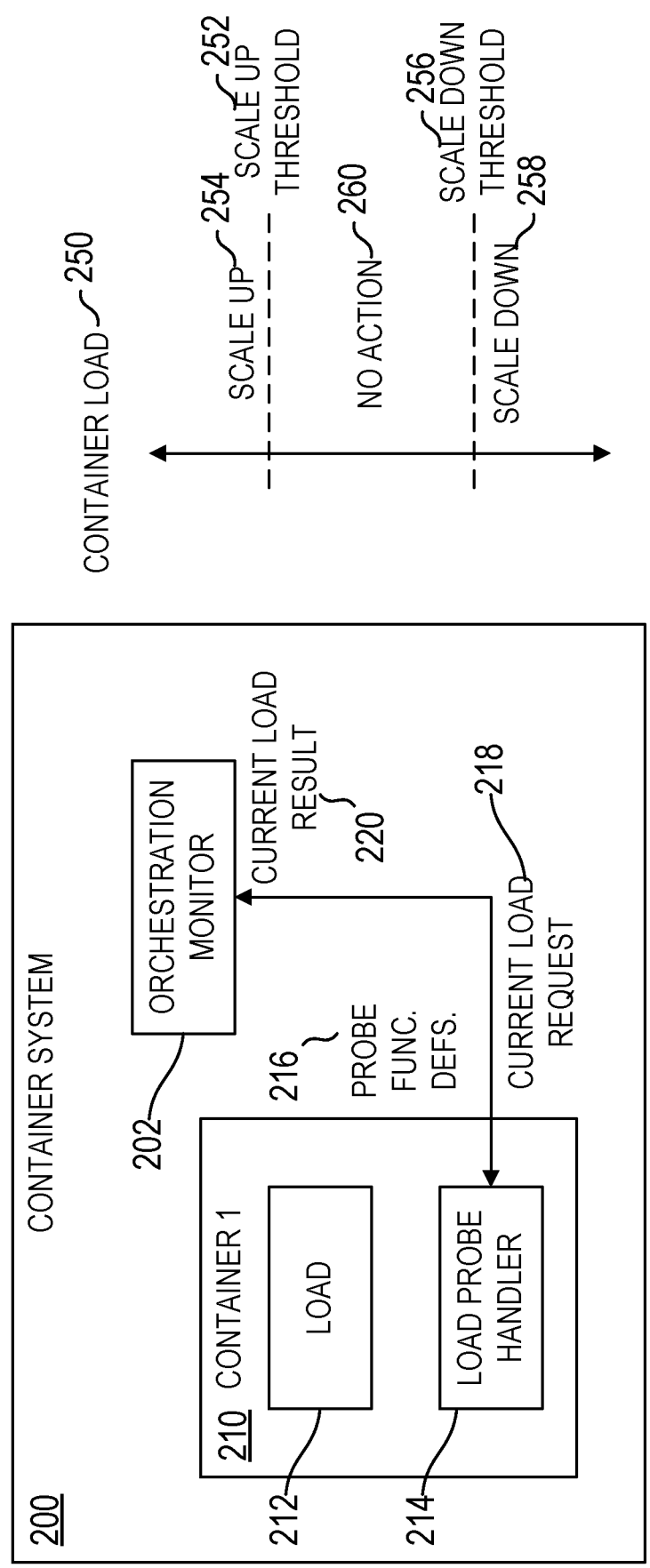
FIG. 2A is a block diagram that illustrates various components of a container system, according to some embodiments.
FIG. 2B is a graph illustrating container load vs. action, according to some embodiments.

FIG. 2A is a block diagram illustrating a container system 200, according to some embodiments. The container system 200 makes use of an orchestration monitor 202 to interact with the container load probe handler 214 whose functionality has been loaded into a container 210 of a computer node within the container system 200. In at least some embodiments, the computer node may be similar to the computer node 50. The container itself runs a load 212, which may comprise applications of, e.g., customers using the container system 200. The container system 200 may operate, e.g., in a cloud computing environment, such as, and without limitation, the cloud computing environment 52, and the computers upon which various elements described herein operate on may include DPSs 10. Various application components for the container system 200 may be a part of the application processing elements 96. The load probe handler 214 may be configured to supplant, complement, or to run independently of any existing load balancing software.

For containers 200 whose load is not depended on or best measured by traditional system resource consumption, such as memory and CPU, a user, such as a developer, may prepare the container load probe handler 214, along with the probe function definitions 216 onto the container. The probe function definitions 216 contain rules for reporting load conditions on the container, and may (but do not have to) interact with running applications. These probe function definitions 216, when used by the container load probe handler 214, make a determination as to whether or not the container 210 can efficiently proceed with more requests or a heavier load, or, alternately, whether the container 210 is being underutilized. The probe function definitions 216, when combined with the load probe handler 214, may contain parameters and/or executable code or software algorithms that are designed to implement the rules for reporting a current load result 220. Advantageously, it may be possible to modify the probe function definitions 216 on-the-fly, and during operation of the load 212 in the container. This may permit a non-disruptive adjustment to the parameters used for creating or eliminating replicas. Similarly, it is possible for different containers 210 to use different probe function definitions 216.

The orchestration monitor 202 may, based upon some criteria, such as periodic timing or driven by some event, such as increased load demand, issue or send a current load request 218 to the load probe handler 214 of the container 210 in order to trigger a receiving of the current load result 220. The load probe handler 214 then makes a determination as to the current capacity of the container 210, based on the probe function definitions 216, and returns a current load result 220 to the orchestration monitor 202. Although the orchestration monitor 202 is shown interacting with a single container 210, it may interact with any number of containers and maintain current load results 220 for each of the containers 210 in, e.g., a table. It may send current load requests 218 at varying times and according to different criteria to the different containers 210, and each container 210 may have a different set of probe function definitions 216 that are based on a particular load 212 of each of the containers.

FIG. 2B is a graph that illustrates some possible actions that may be taken by the orchestration monitor 202 in response for receiving a current load result 220. The container load result 220 provides an indication of the container load 250, according to the criteria specified in the probe function definitions 216. If the current load result 220 is at or above some predefined scale-up threshold 252, then the orchestration monitor 202 may scale up container replicas 254 to process incoming traffic. Conversely, if the current load result 220 is at or below some predefined scale-down threshold 252, then the orchestration monitor 202 may scale down container replicas 254 in order to free system resources. If the current load result 220 is in between the scale-up threshold 252 and the scale-down threshold 256, then no action 260 needs to be taken by the orchestration monitor 202.

The load probe handler 214 in combination with the probe function definitions 216 provide a programmable way to model a determined method for scaling. By way of example, the load probe handler can monitor a queue size of a current unit of work and, based on a grow/shrink speed, modify the number of replicas. In another example, the number of replicas may depend on information from an external system that processes a unit of work that informs orchestration monitor 202 about over/under load—this particular case may be used to extend a waiting queue using additional replicas. In a further example, the number of replicas may be modified based on an internal load method that is based on unit of work characteristics; for example, the container system 200 may process set of invoices, and based on the number of invoices in a particular request the number of replicas may be scaled up or down.

An example may be that the probe function definitions 216 contain information that a minimum number of replicas is one, a maximum number of replicas is one hundred, that the scale-up threshold value 252 is eighty, and the scale-down threshold value 256 is five. It is further possible that the scale-up 254 and scale-down 258 are proportional to the current load result 220, i.e., a current load result of ninety-eight results in a faster scale-up 254 than a current load result of eighty. For example, a 1:1 scaling proportion may be defined such that every value of the current load result 220 over the scale-up threshold 252 may dictate the number of replicas that should be added. This may be similarly applied for removing replicas when the current load result 220 is below the scale-down threshold 256. A 2:1 scaling proportion may be defined such that for six replicas reporting that they are below the scale-down threshold 256, then three of those replicas may be terminated.

Alternately, the scaling proportions may be based on a difference between the current load result and the nearest threshold, or, put differently, proportional to the current load result minus one of the predetermined thresholds. For example, if the scale-up threshold 252 is eighty, and the current load result is eighty-two, this may dictate that two replicas should be added, whereas if the current load result is eighty-four, then this may dictate that four replicas should be added. Any formula or function may be used in determining the number of replicas to add or removed based on the current load result and thresholds. These actions may be subject to absolute minimum and maximums for the number of replicas. The above example(s) may be based on an arbitrary scale, such as one in which the range is zero to one hundred, with zero meaning idle, and one hundred meaning more additional work cannot be meaningfully or efficiently processed.

The solution may work with existing load balancers because it uses a different set of criteria than traditional load balancers, namely, those defined by the probe function definitions 216. A traditional load balancer may, e.g., only create additional replicas if the CPU or memory resources are reaching critical thresholds. However, the orchestration monitor 202 may have used different criteria for its probe function definitions 216, and thus may scale up replicas for criteria defined in other ways, particularly when better responsiveness is desired, but in the absence of exceeding traditional resource limitations. For example, if an important news story breaks on a news service container 210, it may be desirable to provide better responsiveness for access to information related to the news story, even if the traditional resources are not being exceeded.

The container system 200 provided herein allows the probe function definitions 216 to define, e.g., a different set of criteria, such as being based on the news story, to dictate whether to scale up the replicas or not. The orchestration monitor 202 (or other entity) may also make predictions about anticipated loads 212 in the future based on advanced algorithms, e.g., machine learning algorithms and the like, so that a scale up or scale down of replicas may take place in a more intelligent manner. This information may be based on past history performance data that may be collected during operation. Thus, the probe function definition 216 may utilize predictive information based on past performance history.

Figure 3:
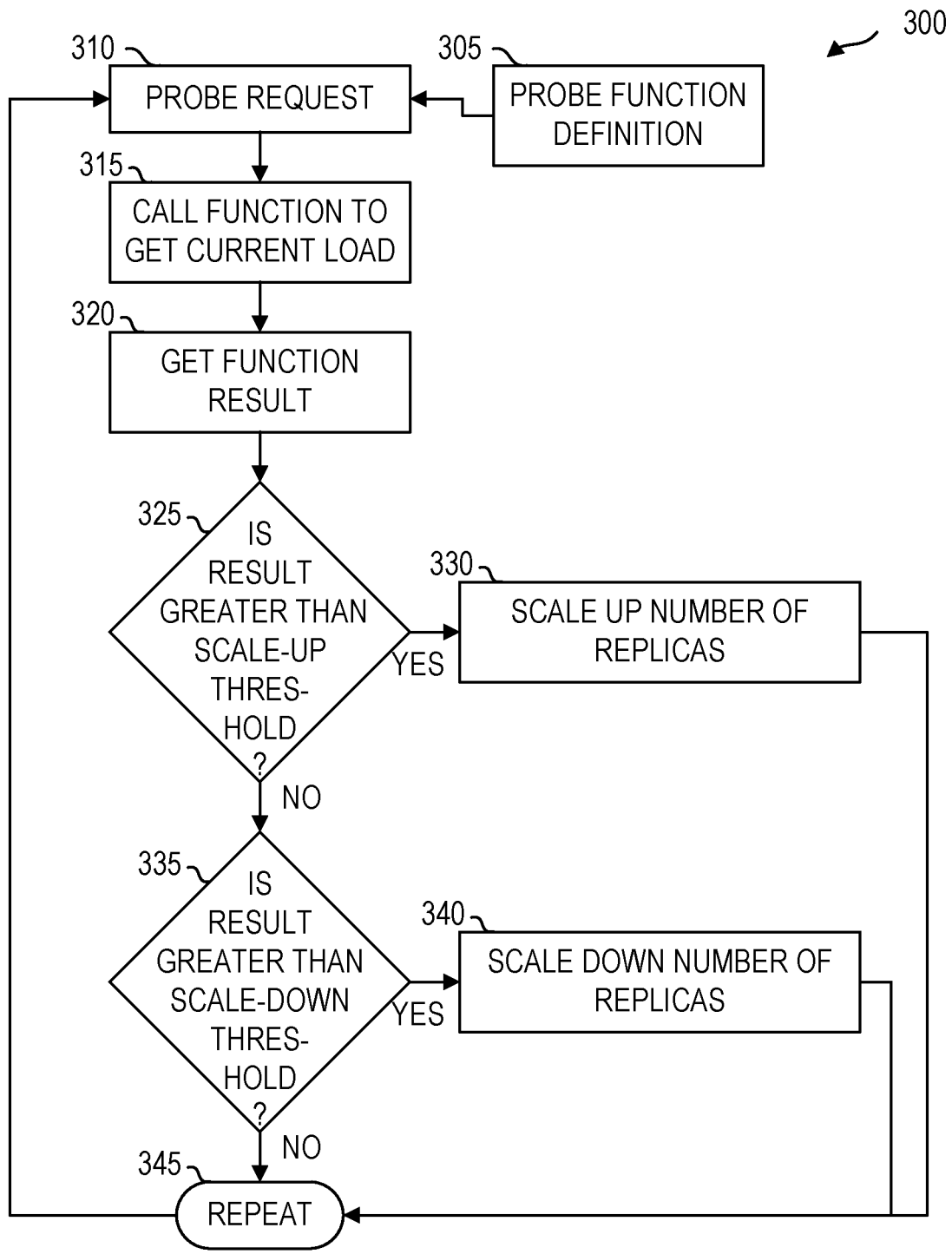
FIG. 3 is a flowchart illustrating a process for implementing some embodiments of the container system.

FIG. 3 is an example process 300 for implementing the load probe handler 214, according to some embodiments. In operation 305, a probe function definition 216 may be provided by a user. A user may be defined herein as, e.g., a system administrator, a developer, and/or an integrator. According to some embodiments, the user defines the probe function definitions 216 and possibly the load probe handler 214 itself, and in operation 305, the load probe handler 214, along with its function definitions 216 may be send or downloaded to the software container 210 by the orchestration monitor 202 or the load probe handler 214, and optionally its function definitions 216 may be included as a part of the container 210. As discussed above, the user may define, e.g., scale-up 252 and scale-down 256 threshold values for, respectively, a maximum load that determines when a scale-up replica is required 254, and a minimum load for when a replica/container is to be killed 258. The user may also define a test interval that determines how often (or under what conditions, e.g., on demand, etc.) a container load probe should be done by the orchestration monitor 202.

When the conditions indicate that the container check should be done (e.g., the expiration of a timer or when other conditions that may have been set by the user are met), then the load probe request 218, in operation 310 is executed. In operation 315, this has the orchestration monitor 202 making a call to the load probe handler 214 to provide it with a current load result 220. In operation 320, the current load result 220 is determined by the container load probe handler 214 in conjunction with the probe function definitions 216.

In operation 325, the orchestration monitor 202 determines what action to take based on the current load result 220 received. If the current load result 220 is greater than or equal to the scale-up threshold 252 (325:Y), then the process 300, in operation 330 scales up the number of replicas 254, and repeats 345 the process of waiting for the current load probe request 218 in operation 310. Otherwise (325:N) processing continues. In operation 335, if the current load result 220 is less than or equal to the scale-down threshold 256 (335:Y), then the process 300, in operation 340 scales down the number of replicas 258, and repeats 345 the process of waiting for the current load probe request 218 in operation 310. Otherwise (335:N), the process 300 repeats 345 waiting for the current load probe request 218 in operation 310. An alert may be triggered upon certain predefined criteria being met (e.g., exceeding thresholds) and/or upon a particular activity taking place (e.g., scaling up 330 or scaling down 340 the number of replicas).

The system and method described herein thus provide a new additional mechanism on a container management system to define methods that will be responsible for container scaling when there are factors other than traditional resource load factors determining scaling actions.

TECHNICAL APPLICATION

The one or more embodiments disclosed herein accordingly provide an improvement to computer technology. For example, an improvement to the operation of a container-based system improves the overall efficiency of distributed computing resources, such as those operating in a cloud environment.

What is claimed is:

1. A computer implemented method, comprising:
   determining a current load result of a software container executing on a compute node in a container system;
   in response to determining that the current load result exceeds a predetermined scale-up threshold for the software container, adding a first plurality of replicas of the software container to the compute node, wherein a quantity of the first plurality of replicas is related to the current load result; and
   in response to determining that the current load result is less than a predetermined scale-down threshold for the software container, deleting a second plurality of replicas of the software container from the compute node, wherein a quantity of the second plurality of replicas is related to the current load result;
   wherein being related to the current load result is being proportional to the current load result minus one of the predetermined thresholds.

2. The method of claim 1, further comprising:
   downloading a load probe handler to the software container; and
   receiving the current load result from the load probe handler as the determining of the current load result.

3. The method of claim 2, further comprising sending a current load request to the load probe handler to trigger the receiving of the current load result.

4. The method of claim 3, wherein the sending of a current load request is done on a periodic basis or responsive to an event.

5. The method of claim 2, wherein the load probe handler works independently of a load balancer of the container system.

6. The method of claim 1, further comprising triggering an alert when a predefined criteria is met.

7. A computer implemented method, comprising:
   determining a current load result of a software container executing on a compute node in a container system;
   in response to determining that the current load result exceeds a predetermined scale-up threshold for the software container, adding a first plurality of replicas of the software container to the compute node, wherein a quantity of the first plurality of replicas is related to the current load result; and
   in response to determining that the current load result is less than a predetermined scale-down threshold for the software container, deleting a second plurality of replicas of the software container from the compute node, wherein a quantity of the second plurality of replicas is related to the current load result;
   downloading a load probe handler to the software container;
   receiving the current load result from the load probe handler as the determining of the current load result; and
   downloading a probe function definition to the load profile handler that are used by the load profile handler to determine the current load result.

8. The method of claim 7, wherein a plurality of software containers have different probe function definitions.

9. The method of claim 7, wherein the probe function definitions comprise rules.

10. The method of claim 9, wherein the rules comprise software parameters.

11. The method of claim 9, wherein the rules comprise software algorithms.

12. The method of claim 7, further comprising downloading additional probe function definitions while the container is running.

13. The method of claim 7, wherein the probe function definitions utilize predictive information based on past performance history.

14. The method of claim 7, wherein the probe function definitions are received from a user.

15. The method of claim 7, wherein the user is selected from the group consisting of a system administrator, a developer, and an integrator.

16. A container-based system, comprising:
   a memory; and
   a processor that is configured to:
      determine a current load result of a software container executing on a compute node in a container system;
      in response to the determination that the current load result exceeds a predetermined scale-up threshold for the software container, add a first plurality of replicas of the software container to the compute node, wherein a quantity of the first plurality of replicas is related to the current load result;
      in response to the determination that the current load result is less than a predetermined scale-down threshold for the software container, delete a second plurality of replicas of the software container from the compute node, wherein a quantity of the second plurality of replicas is related to the current load result;
      download a load probe handler to the software container;
      receive the current load result from the load probe handler as the determining of the current load result;
      send a current load request to the load probe handler to trigger the receiving of the current load result, wherein the sending of a current load request is done on a periodic basis or responsive to an event;
      download probe function definitions to the load profile handler that are used by the load profile handler to determine the current load result;
   wherein:
      a plurality of software containers have different probe function definitions; and
      the probe function definitions comprise rules that comprise software parameters and software algorithms.

* * * * *